United States Patent [19]

Berkowitz et al.

[11] Patent Number: 4,889,091
[45] Date of Patent: Dec. 26, 1989

[54] ROTARY VALVE FOR NATURAL GAS ROTARY ENGINE

[75] Inventors: Murray Berkowitz, Woodcliff Lake; John Abraham, Wayne, both of N.J.

[73] Assignee: John Deere Technologies International, Inc., Moline, Ill.

[21] Appl. No.: 255,282

[22] Filed: Oct. 11, 1988

[51] Int. Cl.[4] .............................................. F02B 53/06
[52] U.S. Cl. ...................................... 123/219; 123/242
[58] Field of Search ............... 123/208, 216, 219, 242; 418/15, 61.2, 270

[56] References Cited

U.S. PATENT DOCUMENTS 3,867,910  2/1975  Galonska ..................... 123/208 X
4,082,065  4/1978  Baxter ............................ 123/219

FOREIGN PATENT DOCUMENTS 1322239  2/1963  France ................................ 123/242

OTHER PUBLICATIONS

"Direct Injection of High-Pressure Natural Gas in Reciprocating Engines", Dr. L. O. Hoppie, Gas Research Institute, Chicago, Ill., Mar. 1986.

Primary Examiner—Michael Koczo

[57] ABSTRACT

A rotary internal combustion engine includes a fuel intake port located in the periphery of the rotor housing near the air inlet end of the major axis of the two-lobed profile defined thereby. A rotary valve controls communication between the fuel intake port and a source of gaseous fuel such as natural gas. The valve includes a rotary valve member so that the communication is open between the source and the fuel intake port when rotor pockets are facing the intake port.

5 Claims, 2 Drawing Sheets

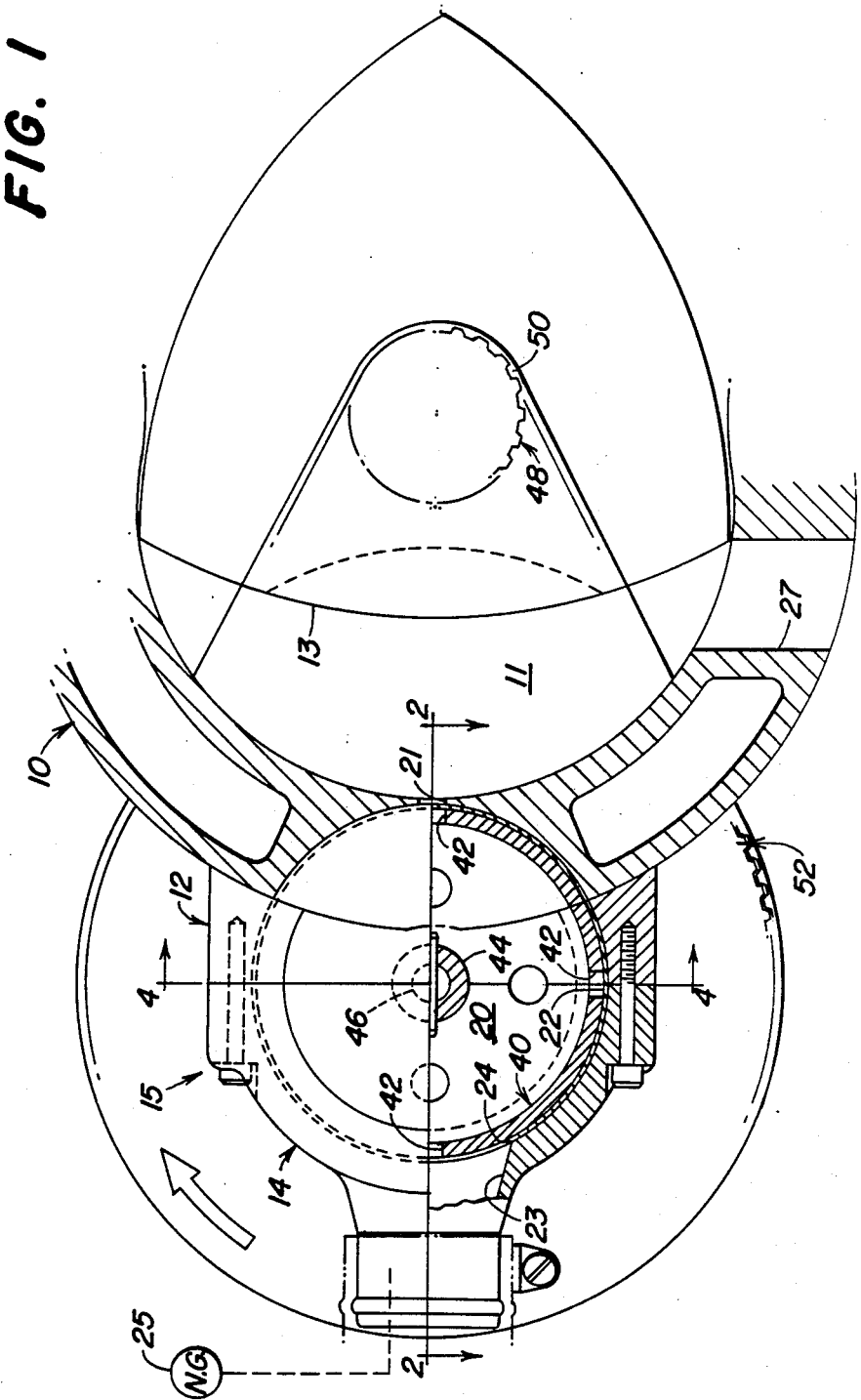

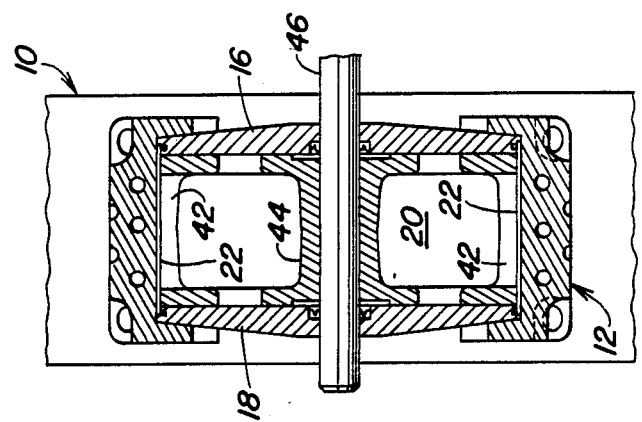
FIG. 4
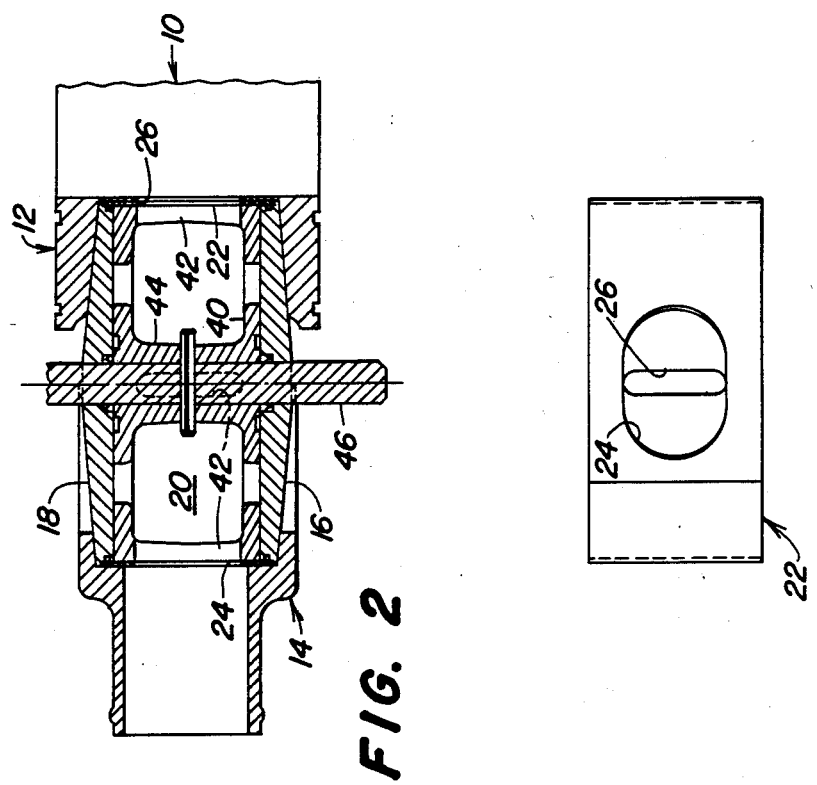
FIG. 2
FIG. 3

ROTARY VALVE FOR NATURAL GAS ROTARY ENGINE

BACKGROUND OF THE INVENTION

This invention relates to a rotary internal combustion engine and, more particularly, to a stratified charge natural gas rotary internal combustion engine.

Rotary combustion engines generally burn gasoline or diesel-type fuels which are liquid at normal pressures and temperatures. A rotary combustion engine for burning gaseous type fuels is described in U.S. Pat. No. 3,886,907, wherein a natural gas side intake port is positioned so that there is no overlap of the gas intake with the exhaust port and so that the gas intake closes before the air intake closes. Another proposed design for a natural gas rotary engine is described in SAE Technical Paper 850034, "Development of a Natural Gas Stratified Charge Rotary Engine" by Sierens and Verdonck. In this proposed design, natural gas is introduced along with the air via the conventional side air intake and natural gas or a mixture of natural gas and air is introduced through a peripheral intake just downstream of the conventional air intake. However, with such engines, it is believed that the gaseous fuel would be concentrated in the trailing portion of the combustion chamber. This leads to flame quenching and leakage, resulting in reduced efficiency and high hydrocarbon emissions.

SUMMARY OF THE INVENTION

An object of the present invention is to provide a fuel efficient and clean burning stratified charge natural gas fueled rotary internal combustion engine.

This and other objects are achieved by the present invention wherein a natural gas intake is located near the major axis of a an engine rotor housing having a two-lobed epitrochoidal profile. A rotary valve controls communication between a source of natural gas and the natural gas intake. The valve includes a hollow cylindrical valve member with four equally spaced openings The valve member is rotated at one-fourth the rotation speed of the engine crankshaft so that communication between the source and the intake is fully open when each rotor face faces towards the intake, such as when the eccentric shaft has rotated approximately 90 degrees past top-dead-center position.

BRIEF DESCRIPTION OF THE DRAWINGS

FIG. 1 is a partial sectional view of a rotary engine including the present invention and viewing parallel to the rotation axis of the engine.

FIG. 2 is a sectional view take along line 2—2 of FIG. 1.

FIG. 3 is a view of the dry bushing of the present invention.

FIG. 4 is a sectional view taken along lines 4—4 of FIG. 1.

DETAILED DESCRIPTION

A rotary engine rotor housing 10 (partially shown in FIG. 1), encloses a trochoidal chamber 11 within which a three-sided rotor 13 rotates. A natural gas inlet valve 15 has a rotary valve base 12 attached to the outer periphery thereof by bolts and locating dowels (not shown). A valve housing cap 14 is bolted to the base 12. The base 12 and cap 14 are coupled in a clamping manner to axial side walls 16 and 18 (FIGS. 2 and 4). As seen in FIGS. 1 and 2, the housing 10, the base 12, the cap 14 and the side walls 16 and 18 enclose a cylindrical chamber 20. This chamber 20 is communicated to the interior of the rotor housing 10 via an opening 21 in the inner surface of housing 10. Preferably, this opening 21 is aligned near the end of the major axis of the housing 10 nearest to air intake port 27. Inlet 23 communicates chamber 20 with a source of pressurized natural gas 25. Preferably, source 25 is regulated at approximately atmospheric pressure or less.

A thin cylindrical dry bearing or bushing 22 (such as, for example, The Federal Mogul Co. dry bearing material "FEDLON") is received within chamber 20 and is non-rotatably held against the radially inner walls of base 12 and cap 14 by the radially outer portions of side caps 16 and 18. As best seen in FIG. 3, the bushing 22 has a larger inlet opening 24 and a smaller outlet opening 26. When installed in chamber 20, the inlet opening 24 is aligned with inlet port 23 of valve cap 14 and outlet 26 is aligned with housing opening 21. Preferably, a sealant, such as RTV silicon sealant, will be used to prevent natural gas from leaking between housing 10, base 12, cap 14, side walls 16 and 18 and bushing 22.

A hollow cylindrical valve member 40 is rotatably mounted in chamber 20 in sliding engagement with the inner surface of bushing 22. Valve member 40 has four identically shaped, equally spaced apertures or openings 42 which extend radially therethrough. Openings 42 can vary in size relative to bushing opening 26 and housing opening 21 to vary the timing of fuel introduction. Valve member 40 includes a hub 44 which is driven by a shaft 46. The shaft 46 and valve member 40 are driven at one-fourth the rotation speed of the engine crankshaft (not shown), preferably by a crankshaft gear 48, belt 50 and valve gear 52. Preferably, each pair of the apertures 42 will be aligned as shown in FIG. 1 to fully open communication between chamber 11 and inlet 23 when the rotor eccentric is positioned approximately 90 degrees past its top-dead-center position. Alternatively, the number of openings 42 could be varied as long as the rotation speed of valve member 40 is adjusted so that at least two of the openings are aligned with opening 21 and inlet 23 when the pockets of each rotor side face are facing towards the fuel inlet 23. As a result, natural gas will enter the chamber 11 as the pockets in each rotor side face are facing towards the inlet port 23. Fuel will therefore be concentrated within the central region of the volume adjacent the rotor combustion chamber pockets and very little fuel will be present near the rotor apexes. The result is an efficient and clean burning stratified charge natural gas rotary engine.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims. For example, the present invention could be used in multi-unit rotary engines by providing a separate rotary valve for each unit.

We claim:

1. A rotary engine having a housing, a crankshaft and a three-sided rotor rotatable therein and coupled to the crankshaft, the housing defining an inner running surface having a two-lobed epitrochoidal profile defined by a minor axis and a major axis, the housing having an air intake port and a fuel intake port, characterized by:

the fuel intake port extending radially through a portion of the running surface near the end of the major axis towards the air intake port;

a supply of gaseous fuel; and a valve for controlling communication of the gaseous fuel to the fuel intake port, the value operating to open communication between the supply and the fuel intake port as each rotor side faces the fuel intake port, the valve comprising a housing enclosing a cylindrical chamber therein, an inlet communicating the supply with the chamber and an outlet communicating the chamber with the fuel intake port, and a valve member rotatable within and slidably and sealingly engaging walls of the chamber, the valve member having a passage extending radially therethrough and the valve member being rotatable to an open position wherein the passage communicates the inlet with the outlet and to a closed position wherein communication between the inlet and outlet is closed.

2. The rotary engine of claim 1, wherein:

the valve member includes first and second passages extending radially therethrough at right angles to each other.

3. The rotary engine of claim 2, further comprising:

means for rotating the valve member at one-fourth of a rotation speed of the crankshaft of the engine.

4. A rotary engine having a housing, a crankshaft and a three-sided rotor rotatable therein and coupled to the crankshaft, the housing defining an inner running surface having a two-lobed epitrochoidal profile defined by a minor axis and a major axis, the housing having an air intake port and a fuel intake port, characterized by:

the fuel intake port extending radially through a portion of the running surface near the end of the major axis towards the air intake port, a supply of gaseous fuel; and a valve for controlling communication of the gaseous fuel to the fuel intake port, the valve operating to open communication between the supply and the fuel intake port as each rotor side faces the fuel intake port, the valve comprising a valve housing mounted to an outer surface of the rotary engine housing, the valve housing and the engine housing enclosing a cylindrical chamber therein, the valve housing having an inlet communicating the gaseous fuel supply to the chamber, the fuel intake port extending through the engine housing and communicating with the chamber, a hollow cylindrical valve member rotatable within the chamber, the valve member comprising a central hub, a pair of side members extending radially from opposite ends of the hub and an annular outer member extending axially between the radially outer portions of the side members, the outer member having a plurality of equally spaced-apart apertures extending radially therethrough, and means for rotating the valve member to a closed position wherein the outer member closes communication between the inlet and the intake port and to an open position wherein a pair of the apertures are aligned with and open communication between the inlet and the intake port.

5. The rotary engine of claim 4, wherein:

the means for rotating rotates the valve member at one-fourth of a rotation speed of the crankshaft of the engine; and the plurality of apertures comprises four apertures.

* * * * *